United States Patent
Zheng et al.

(10) Patent No.: US 10,181,949 B2
(45) Date of Patent: Jan. 15, 2019

(54) DATA DISTRIBUTING OVER NETWORK TO USER DEVICES

(71) Applicant: Futurewei Technologies, Inc., Plano, TX (US)

(72) Inventors: Qingji Zheng, Santa Clara, CA (US); Guoqiang Wang, Santa Clara, CA (US); Ravishankar Ravindran, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 56 days.

(21) Appl. No.: 14/881,003

(22) Filed: Oct. 12, 2015

(65) Prior Publication Data
US 2016/0105279 A1 Apr. 14, 2016

Related U.S. Application Data (60) Provisional application No. 62/063,304, filed on Oct. 13, 2014.

(51) Int. Cl.
*H04L 9/08* (2006.01)
*H04L 9/14* (2006.01)
*H04L 29/06* (2006.01)

(52) U.S. Cl.
CPC .......... *H04L 9/0822* (2013.01); *H04L 9/0825* (2013.01); *H04L 9/0841* (2013.01); *H04L 9/14* (2013.01); *H04L 63/045* (2013.01); *H04L 63/0464* (2013.01); *H04L 2209/60* (2013.01); *H04L 2209/76* (2013.01)

(58) Field of Classification Search
CPC .......... H04L 63/0464; H04L 2209/76
USPC ........................................... 713/171
See application file for complete search history.

(56) References Cited

U.S. PATENT DOCUMENTS

| | | | |
|---|---|---|---|
| 7,184,550 B2* | 2/2007 | Graunke | H04L 9/065 380/277 |
| 8,472,627 B2* | 6/2013 | Denning | H04L 63/0428 380/258 |
| 9,397,835 B1* | 7/2016 | Campagna | H04L 9/32 |

(Continued)

FOREIGN PATENT DOCUMENTS

| | | |
|---|---|---|
| CN | 101127597 A | 2/2008 |
| CN | 101145915 A | 3/2008 |

(Continued)

OTHER PUBLICATIONS

International Search Report and Written Opinion for PCT/CN2015/091883, dated Jan. 18, 2016. 12 pages.

(Continued)

*Primary Examiner* — Khalil Naghdali
(74) *Attorney, Agent, or Firm* — Yeh Kurt Chang (57) ABSTRACT

A data device controls distribution of data to user devices through an edge router via an encryption scheme. The data device encrypts data using a first key and a public key, and sends the data to the edge router. The edge router encrypts the encrypted data with a second key and sends the re-encrypted data to a user device. The data device then authenticates the user device and issues a decryption key derived from a private key corresponding to the public key, the first key, and the second key to the user device. The user device uses the decryption key to decrypt and access the data.

16 Claims, 4 Drawing Sheets

(56) References Cited

U.S. PATENT DOCUMENTS

2004/0032950 A1    2/2004  Graunke
2013/0016839 A1    1/2013  Miyazawa

FOREIGN PATENT DOCUMENTS

| CN | 102740239 A  | 10/2012 |
| CN | 103391541 A  | 11/2013 |
| EP | 1699162 A2   | 9/2006  |
| EP | 2290871 A2   | 3/2011  |

OTHER PUBLICATIONS

Wood, Christopher A. et al., "Flexible End-to-End Content Security in CCN," Consumer Communications and Networking Conference (CCNC), 2014 IEEE 11th. IEEE, 2014. 8 pages.

Fotiou, Nikos et al., "Access Control Enforcement Delegation for Information-Centric Networking Architectures," Proceedings of the second edition of the ICN workshop on Information-centric networking. ACM. pp. 85-90 (Aug. 17, 2012).

Misra, S. et al., "Secure Content Delivery in Information-Centric Networks: Design, Implementation, and Analyses," Proceedings of the 3rd ACM SIGCOMM Workshop on Information-centric Networking. ACM, pp. 73-78 (Aug. 12, 2013).

* cited by examiner

DATA DISTRIBUTING OVER NETWORK TO USER DEVICES

CROSS-REFERENCE TO RELATED APPLICATIONS

This application claims priority to U.S. Provisional Application No. 62/063,304, entitled "Secure and Scalable Data Access Control System in Information Centric Networking," filed on Oct. 13, 2014, hereby incorporated by reference in its entirety.

BACKGROUND

Publisher provides data to subscribers via routers. Such as, in Information-centric networking (ICN), publisher provides data, the data are cached by routers, and then subscribers can efficiently access data through nearby routers (e.g., edge routers). While ICN has many promising properties, such as built-in security and in-network caching, it also brings challenges that might hinder its adoption if not satisfactorily resolved. Data access control is one of those challenges.

Various data access control mechanisms have been proposed for environments other than ICN, such as content distribution networks (CDNs). Data access control mechanisms depend on the amount of trust that can be assumed for data distribution entities (e.g., routers) in the CDN environments. CDN model assumes that the data distribution entities can be fully trusted by publishers and are responsible for distributing data to authorized users. Unfortunately, this model cannot be applied to ICNs, because ICN routers cannot be fully trusted and therefore cannot be delegated with access control enforcement.

SUMMARY

In general, embodiments according to the present disclosure separate data distribution into two phases: a first phase that is implemented between a data device and a router; and a second phase that is implemented between the router and customers (user devices). In the first phase, data is encrypted using the same set of keys, so that the data can be shared. In the second phase, the encrypted data is re-encrypted under a key specific to each user or user device. This approach may be referred to herein as dual-phase encryption.

In an embodiment, the data device encrypts data using a first key and a public key, and sends the data to an edge router. The edge router encrypts the encrypted data with a second key and sends the re-encrypted data to a customer's device. The data device then authenticates the customer's device, generates a decryption key derived from a private key and the first and second keys, and sends the decryption key to the customer's device.

More specifically, in an embodiment, an edge router receives first ciphertext (e.g., from a data device). The first ciphertext includes data encrypted using a first key and a public key. The edge router generates a second key for the user device; in an embodiment, the second key is randomly and uniformly generated by the edge router, independent of the publisher and the data device. The edge router encrypts the first ciphertext with the second key (the first ciphertext is encrypted again). The edge router also encrypts the second key. The edge router sends the second ciphertext (the re-encrypted first ciphertext) to a user device (the customer's device), sends the third ciphertext (the encrypted second key) to a user device or a data device. Once the customer's device is authenticated (e.g., by the data device), the customer device receives a decryption key (e.g., from the data device), which can use the decryption key to decrypt the second ciphertext and access the data. The decryption key is based on a private key related to the public key, the first key, and the second key.

With dual-phase encryption, the edge router generates the second key for the user device, and the data device authenticates the user device. The decryption key cannot be used to derive the private key or the first key if the second key is chosen uniformly at random. Thus, if a customer's decryption key is compromised, it cannot be used to decrypt other data stored by the routers.

DETAILED DESCRIPTION

Figure 1:
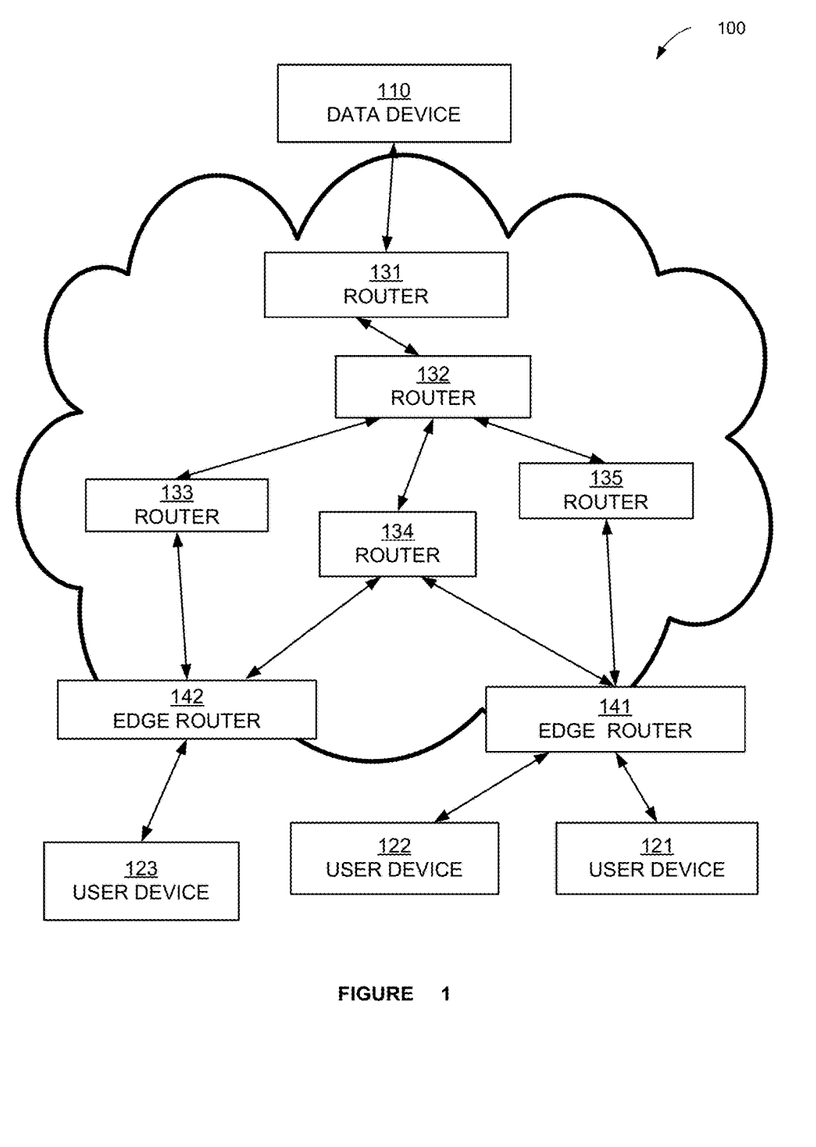
FIG. 1 is an example of a system on which embodiments according to the present disclosure can be implemented.

FIG. 1 is a system 100 on which embodiments according to the present disclosure can be implemented. In an embodiment, the system 100 is an example of an information-centric network (ICN) architecture.

In the example of FIG. 1, the system 100 includes a data device (e.g., publisher device or data publisher) 110, user devices (e.g., subscriber device) 121, 122, and 123, routers 131, 132, 133, 134, 135, 141 and 142. The routers include edge routers 141 and 142. In essence, edge routers are routers that are located at the edge of the system 100. The user devices 121-123 also referred to herein as customer devices.

The elements of the system 100 may be associated with different enterprises and human users. For example, the data device 110 may be associated with an enterprise that owns and controls content (e.g., a movie studio that owns a movie) and/or an enterprise that simply controls that content (e.g., a service provider that streams the movie). For example, a user device may be associated with a human customer (an individual subscriber) and/or another enterprise (e.g., the service provider that streams video may be a customer of a movie studio).

The data device (e.g., publisher device or data publisher) are the source of the data, and provides data to routers. The data device 110 encrypts the data m and distributes encrypted data to the routers. Routers are responsible for transmitting the data from one hop to another hop (e.g., from the router 131 to the router 132, and so on). A router can cache the transferred data in a local cache. Upon receiving a request for an instance of content, if the requested data is cached locally, then the router can fetch it and respond with the cached copy. An edge router (e.g., the edge router 141) has the functions of a router. Beyond that, an edge router allows the data publisher to deploy some specific service that is controlled by the data publisher. The user device (e.g., the user device 121) is used by the customer that wants to access and use the data controlled by the data publisher.

As mentioned above, in comparison with the routers 131-135, the edge routers 141 and 142 allow the publisher to deploy certain services, which in turn can handle users' requests for the publisher's data. The data device 110 encrypts its data and publishes encrypted data through the routers. The routers 131-135 and edge routers 141 and 142 not only forward encrypted data to appropriate destinations (e.g., the user devices 121-123), but also cache it according to their cache replacement policies to support in-network caching.

In an embodiment, the routers 131-135 and edge routers 141 and 142 are assumed to honestly execute their predefined protocols, but attempt to learn as much private information as possible. It is also assumed that edge routers will not be susceptible to collusion with customers. Namely, the edge routers 141 and 142 will not share information they have with the user devices 121-123. It is also assumed that customers can be malicious and can collude together. The publisher is assumed to be trusted. It is also assumed that authentication mechanisms, e.g., public key infrastructure (PKI), are present so that the publisher can properly authenticate its customers.

Thus, in an embodiment, some assumptions are as follows:
1) The data publisher is trusted.
2) The authorized data users are trusted. Unauthorized data users are malicious, and will try to learn information about encrypted data by various means, e.g., by stealing an authorized data user's decryption key.
3) The routers and edge routers are honest-but-curious. That is, they will follow the predefined protocols honestly, but attempt to learn more information about the encrypted data, for example.
4) The edge routers and malicious data users cannot collude together.

Data published by the data device 110 is large, meaning that it is not feasible to apply public key encryption directly on the data; e.g., attribute-based encryption, proxy re-encryption, and broadcast encryption are not feasible. That is, encrypting the data with public key encryption is too expensive from a computational overhead point of view.

Embodiments according to the present disclosure enable the data device to: (i) distribute its encrypted data to customers efficiently by routers caching, (ii) enforce access control on its encrypted data by distributing decryption keys, and (iii) protect encrypted data cached by routers even if an authorized customer's decryption key was compromised. Embodiments according to the present disclosure achieve these benefits using dual-phase encryption as described above and further described below.

There exists a chosen-plaintext secure symmetric encryption SE, e.g., Advanced Encryption Standard (AES) with cipher block chaining (CBC) mode, such that SE=(KeyGen, Enc, Dec), where KeyGen is the probabilistic process for generating a symmetric key, Enc is the probabilistic process for encrypting the data with the symmetric key, and Dec is the process for decrypting the ciphertext with the symmetric key.

The Modified Computational Diffie-Hellman (mCDH) assumption is described as follows. Let q be an l-bit prime, G be a cyclic group of order q, and g be a generator of G. Given $g^{1/a}$, $g^a$, $g^b$ randomly selected from G where a, b are unknown, the mCDH assumption states that any probabilistic polynomial-time process A can determine whether $Q=g^{ab}$ at most with a negligible advantage in security parameter l, where the advantage is defined as $|Pr[A(p, g, G, g^a, g^b, Q)]-Pr[A(p, g, G, g^a, g^b, g^{ab})]|$.

Embodiments according to the present disclosure instantiate the all-or-nothing transformation (Aont) with the packet transformation technique. An all-or-nothing transformation is an unkeyed, invertible, and randomized function with the property that it is hard to recover the entire message unless the entire function output is known. Given an n+1-block data $m=m_1\|\ldots\|m_{n+1}$, Aont transforms the data m into a γ-block data $m'=m'_1\|\ldots\|m_\gamma$ where γ≥n+1, while satisfying the properties below:
1) Given m, then m'←Aont(m) can be computed efficiently (e.g., polynomial to the length of m).
2) Given m', then m←Aont$^{-1}$(m') can be computed efficiently.
3) Given incomplete m' (at least one block of m' is missing), then the probability of recovering m is negligible at most.

In the following discussion, processes used with and for Dual-phase encryption (DPE) are described. One process is represented herein as Param←Setup($1^l$). Given a security parameter l, it chooses two safe primes p and q, such that q|p−1, where q is l-bit. Let g be a generator of group G that is a subgroup of $Z_p^*$ with order q. Let $H_1$ and $H_2$ be two hash functions such that $H_1: G \to \{0, 1\}^l$ and $H_2: G \times G \to \{0, 1\}^l$. Let Param=(p, q, G, g, $H_1$, $H_2$), SE be a chosen-plaintext secure symmetric encryption, and Aont be a secure all-or-nothing transformation. For simplicity, the following processes are assumed to explicitly take the public parameters as part of their inputs. In an embodiment, this process is performed by the data device 110, which then distributes the parameters to other devices (specifically, the edge routers 141 and 142) that can use those parameters for the encryption and decryption processes presented below.

Another process is represented herein as $(k_s, k_p) \leftarrow$ KeyGen. This process generates a pair of private/public keys $(k_s=\alpha, k_p=g^\alpha)$ where α is selected from $Z_q^*$ uniformly at random. In an embodiment, this process is performed by the data device 110.

Another process is represented herein as $C_1 \leftarrow Enc_1(k_p+k_1, m)$. Given the bulky data m, this process, referred to herein as first phrase encryption, applies the probabilistic symmetric encryption (SE) on m at first and generates a symmetric key $k_1$ for the data m. Then, this process runs $C_1 \leftarrow Enc_1(k_p+k_1, m)$. That is, encrypt data m using $k_1$ and $k_p$ to obtain Suppose the length of ct is a multiple of l (otherwise, it can be padded), such that $ct=ct_1\|\ldots, ct_n$ where $|ct_i|=l$, 1≤i≤n. This process selects $r \leftarrow Z_q^*$ uniformly at random and computes $E=k_p^r$. This process also computes $F_i=H_1(g^r) \otimes ct_i$, 0≤i≤n, where ⊗ is the XOR operator. Therefore, the ciphertext after first phase encryption can be $C_1=(E, F_1, \ldots, F_n)$. In an embodiment, this process is performed by the data device 110.

Another process is represented herein as $C_2 \leftarrow Enc_2(k_2, C_1)$. This process applies the probabilistic symmetric encryption (SE) at first and generates a symmetric key $k_2$ for a user device. Then, this process runs $C_2 \leftarrow Enc_2(k_2, C_1)$. That is, encrypt $C_1$ using $k_2$ to obtain $C_2$. Given $C_1=(E, F_1, \ldots, F_n)$, this process, referred to herein as second phase encryption, randomly selects $k_2 \leftarrow Z_q^*$ uniformly, and computes $E'=E^{k2}$. The process also computes $F_i'=H_2(E^{k2}, g^{1/k2}) \otimes F_i$ for 1≤i≤n. Let $C'_2=(E', F'_1, \ldots, F'_n)$ and then applies Aont on $C'_2$, so that the ciphertext after second phase encryption can be $C_2=Aont(C'_2)$. In an embodiment, this process is performed by a router, in particular an edge router. If $k_2$ is a symmetrical key, the key is symmetrical between a edge router and a data device.

Another process is represented herein as $C_0 \leftarrow Enc_0(k_p, k_2)$. Given a symmetric key $k_2$ for a user device. Then, this process runs $Enc_0(k_p, k_2)$. That is, encrypt $k_2$ using $k_p$ to obtain $C_0$. Given a data $m \in \{0, 1\}^l$, this process selects $r \leftarrow Z_q^*$ uniformly at random, and computes $k_p^r$ and $H_1(g^r) \otimes k_2$, where $\otimes$ is the bit-wise XOR operator. Therefore, the ciphertext $C_0$ can be set to $C_0=(k_p^r, H_1(g^r) \otimes k_2)$. In an embodiment, this process is performed by a router, in particular an edge router (e.g., the edge routers 141 and 142).

Another process is represented herein as $k \leftarrow \text{DecKeyGen}(k_1, k_2, k_s)$. This process generates a decryption key k composed of three components such that $k=(k_1, k_2, k_s)$. That is, the decryption key k includes a combination of $k_1$, $k_2$, and $k_s$. In an embodiment, this process is performed by the data device 110.

Another process is represented herein as $k_2 \leftarrow \text{Dec}_0(k_s, C_0)$. That is, the process decrypts $C_0$ using $k_s$ to get $k_2$ by running $\text{Dec}_0(k_s, C_0)$ Given $k_s$ and $C_0=(k_p^r, H_1(g^r) \otimes k_s)$, this process computes $(k_p^r)^{(1/ks)}=g^r$ so that $k_s=H_1(g^r) \otimes k_s \otimes H_1(k_p^{r(1/ks)})$. In an embodiment, this process is performed by the data device 110.

Another process is represented herein as $m \leftarrow \text{Dec}_2(k, C_2)$. It is to decrypt $C_2$ using k to obtain the bulky data m Given $k=(k_1, k_2, k_s)$ and $C_2$, this process first applies $C'_2=\text{Aont}^{-1}(C_2)$ such that $C'_2=(E', F'_1, \ldots, F'_n)$. The process then computes $h_1=H_1(E'^{(1/(k2ks))})=H_1(g^r)$ and $h_2=H_2(E', g^{ks(1/k2ks)})=H_2(E', g^{(1/k2)})$. For $1 \leq i \leq n$, it computes $ct_i=F_i' \otimes h_1 \otimes h_2$ to recover $ct=ct_1 \| \ldots \| ct_n$. The process then applies $\text{Dec}(k_1, ct)$ to get the bulky data m. In an embodiment, this process is performed by a user device.

Another process is represented herein as $m \leftarrow \text{Dec}_1(k_s+k_1, C_1)$. Given $k_s$, $k_1$, and $C_1=(E, F_1, \ldots, F_n)$, this process first computes $h_1=H_1(E^{(1/ks)})=H_1(g^r)$. For $1 \leq i \leq n$, this process computes $ct_i=Fi \otimes h_1$ and gets $ct=ct_1 \| \ldots \| ct_n$. This process then applies $\text{Dec}(k_1, ct)$ to recover the bulky data m. In an embodiment, this process is performed by a user device (e.g., the user devices 121-123).

For performance reasons, $\text{Enc}_0$ can be used to encrypt small size messages (e.g., symmetric key, etc.), while $\text{Enc}_1$ can be used to encrypt bulky data (e.g., data or media files). Moreover, $\text{Enc}_1$ assures that given $k_1$ (the symmetric key of SE), the ciphertext $C_1$ cannot be decrypted (in a computational sense) except by brute-force methodology, because the ciphertext generated by SE can be regarded as a pseudorandom stream and removing the hash value from $C_1$ is negligible with respect to l.

$\text{Enc}_2$ uses Aont to protect another authorized user's encrypted data if the decryption key is compromised. To clarify this, first consider $\text{Enc}_2$ without applying Aont. Suppose $C_1=(E, F_1, \ldots, F_n)$ is the ciphertext generated by $\text{Enc}_1$, and $C_2=C'_2=(E', F'_1, \ldots, F'_n)$ is the ciphertext generated by $\text{Enc}_2$ with respect to $C_1$, such that $E'=E^{k2}$, $F_i'=H_2(E^{k2}, g^{(1/k2)}) \otimes F_i$, and $k=(k_1, k_2k_s)$ is the decryption key to decrypt $C_2$. If the decryption key k and part of $C_2$ is obtained, namely $E'$ and $F'_1$, then the ciphertext can be decrypted by another execution of $\text{Enc}_2$ on $C_1$ as follows. Let $\overline{C_2}$ be another ciphertext by executing $\text{Enc}_2$ on $C_1$, such that $\overline{C_2}=(\overline{E'}, \overline{F'1}, \ldots, \overline{F'_n})$ where $\overline{E}=E^{k2}$ and $\overline{F'_1}=H_2(\overline{E}, g^{(1/k2)}) \otimes F_i$. Then, without Aont, an adversary can execute $\overline{F'_1}=(F'_1 \otimes F_1) \otimes (F_1 \otimes \overline{F'_1}) \otimes \overline{F'_1}$ for $1 \leq i \leq n$. That is, the adversary can use part of $C_2$ ($E'$, $F'_1$ indeed) and $\overline{C_2}$ to recover the ciphertext $C_2$ and therefore use k to decrypt it.

Aont mitigates this attack because, without the entire ciphertext $C_2$, the adversary cannot recover $C'_2$, and therefore cannot use compromised information (e.g., k, $E'$, $F'_1$) to decrypt ciphertexts of another execution of $\text{Enc}_2$. That is, given the decryption key k, the adversary has to obtain the entire ciphertext $C_2$ with respect to k in order to recover the data. In addition, the adversary cannot learn anything about the data with only the decryption key k and partial ciphertext.

While both dual-phase encryption and proxy re-encryption perform another encryption on original ciphertext, they do have their distinct properties. Proxy re-encryption is suitable for small size data, and cooperates with symmetric encryption if encrypting bulky data. Proxy re-encryption relies on the proxy performing re-encryption to acquire re-encryption keys from the entity (e.g., publisher) possessing the private key. In contrast, for dual-phase encryption, $\text{Enc}_2$ can be run by a router without any further interaction with the data device, which makes dual-phase encryption more flexible.

Figure 2:
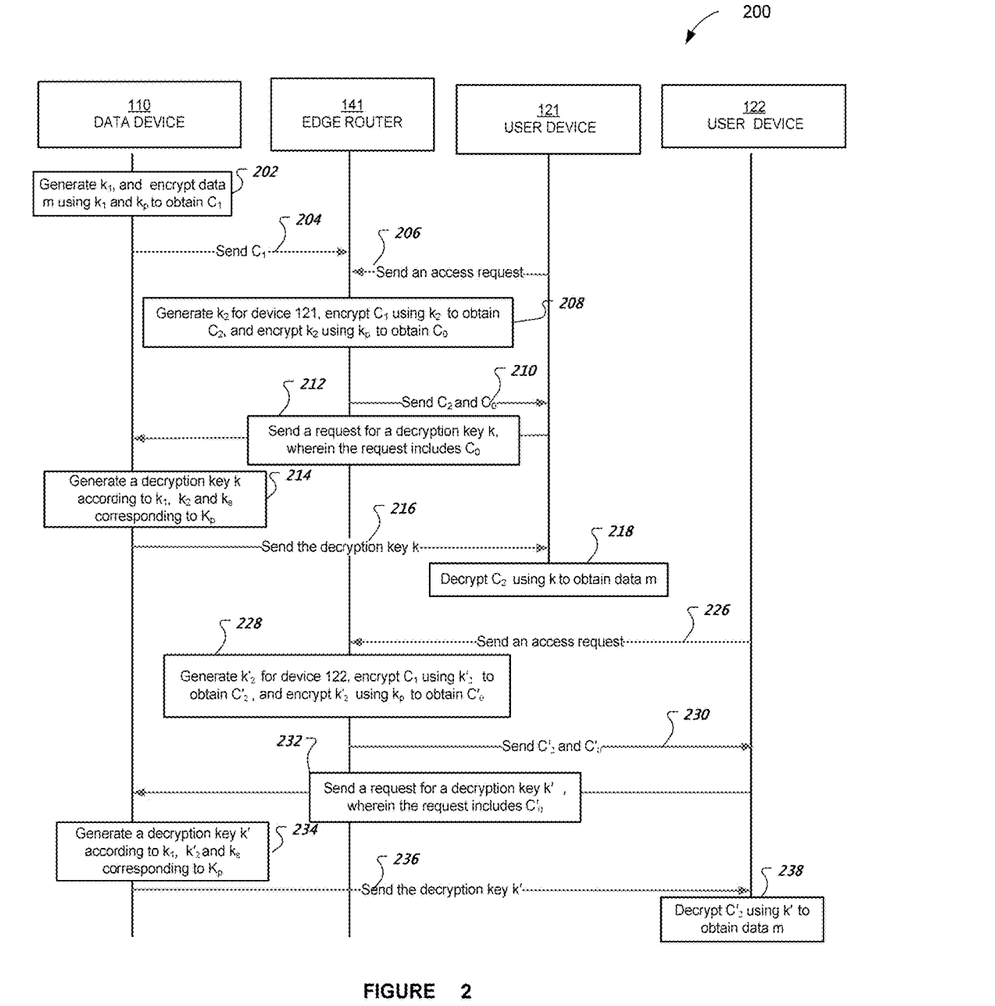
FIG. 2 illustrates a flowchart of a process in an embodiment according to the present disclosure.

FIG. 2 illustrates a flowchart 200 of a process in an embodiment according to the present disclosure. More specifically, FIG. 2 is a diagram showing a sequence of actions and interactions among a data device 110, an edge router 141, and subscribers (user devices 121 and 122), in an embodiment according to the present disclosure.

Before enforcing data access control, the system is set up first. In an embodiment, the system setup operation is executed when the data device 110 bootstraps the system 100 (FIG. 1). In this operation, the data device 110 chooses a security parameter l, and runs the process Setup($1^l$) described above, which outputs the public parameter Param. In addition, the data device 110 runs the process KeyGen (described above) to obtain a pair of public/private keys ($k_p$, $k_s$). Then the data device 110 makes Param and $k_p$ public and keeps $k_s$ secure. Publishing Param and $k_p$ can be done using an existing cryptographic protocol, such as PKI, where the trusted authority can generate a certificate for the data device 110 based on Param and $k_p$.

The data device 110 is publishing the bulky data m to routers at step 202. It can be triggered when a request is received from, for example, the user device 121. Alternatively, this operation can be executed if the data device 110 publishes the data proactively (e.g., as unsolicited data packets in the system 100, absent a request from a user device). Given the bulky data m, the data device 110 generates a symmetric key $k_1$ for the data m, and then runs the process $\text{Enc}_1(k_p+k_1, m)$ (described above), which outputs the ciphertext $C_1$. The data device 110 stores the tuple <$\text{Name}_m$, $k_1$> securely, where $\text{Name}_m$ is a name that uniquely identifies the bulky data m.

The data device 110 transmits the ciphertext $C_1$ to routes at step 204. The edge router 141, as well as other routers and edge routers in the system 100, can then store (cache) the ciphertext $C_1$.

Edge routers, such as edge router 141, receive an access request from subscribers at step 206. This step is executed when the user device 121 is retrieving the requested data m from the edge router 141. This step is a data retrieval operation.

The edge router 141 generates a symmetric key $k_2$ for the user device 121 at step 208. The key $k_2$ is a symmetric key between the data device and the edge router. The edge router 141 runs the process $\text{Enc}_2(k_2, C_1)$ (described above) and outputs the ciphertext $C_2$. The edge router 141 also runs a process $\text{Enc}_0(k_p, k_2)$ to encrypt the key $k_2$ and output the ciphertext $C_0$. Also, in an embodiment, the edge router 141 generates a signature for $C_0$ (e.g., a digital or electronic signature to demonstrate the authenticity of $C_0$).

The edge router sends the ciphertexts $C_0$ and $C_2$ to the user device 121 at step 210. Also, in an embodiment, the edge router 141 delivers that signature for $C_0$ to the user device 121 together with the ciphertexts $C_0$ and $C_2$. The signature of $C_0$ is used to authenticate that $C_0$ is really generated by the edge router 141. When the data device 110 deploys the service, it can pre-assign a pair of public/private keys for that service (the private key can be kept securely), so that the service can generate a signature on $C_0$. By doing this, the data device 110 can confirm that $C_0$ has really been generated by the edge router 141. In addition, the edge router 141 does not need to maintain $k_2$, which can be discarded after executing $Enc_2(k_2, C_1)$.

When the user device 121 accesses the retrieved ciphertext $C_2$, the user device 121 sends a request for a decryption key to the data device 110 at step 212. The request includes its identity (ID), the requested data name $Name_m$, the ciphertext $C_0$, and the signature of $C_0$. Step 212 is an access request operation.

The data device 110 uses that information to verify the identity of the user device 121 at step 214. The data device 110 also checks whether the user device 121 has the necessary permission to access the requested data or not. If not, the data device 110 aborts the access request. Otherwise, the data device 110 verifies the signature of $C_0$, to make sure $C_0$ was generated by the edge router 141, and then decrypts $C_0$ to get $k_2$ by running a process $Dec_0(k_s, C_0)$ (described above). By retrieving $k_1$ according to $Name_m$ (from the tuple <$Name_m, k_1$>), the data device 110 then runs DecKeyGen ($k_1, k_2, k_s$) (described above) to generate the decryption key k. Note that the data device 110 and the user device 121 can authenticate each other with a known mechanism.

The data device 110 sends the decryption key k to the user device 121 at step 216. Moreover, the decryption key k can be sent securely, e.g., by encrypting k with the user device's public key, so that only the designated user device can recover it; or be sending the decryption key k to a third security device, where the third security device keeps the security between the data device 110 and the user device 121.

When the user device 121 receives the decryption key k from the data device 110, the user device runs the process $Dec_2(k, C_2)$ (described above) to obtain the bulky data m at step 218. Step 218 is a data access operation.

The data retrieval, access request, and data access operations can be repeated for a different user device (for example, the user device 122), as follows. For instance, the user device 122 is retrieving the requested data m from the edge router 141 (that is, in this example, the user device 122 is requesting the same data m that was requested by the user device 121) at step 226.

The edge router 141 generates a symmetric $k'_2$ for the user device 122 at step 228. The symmetric key $k'_2$ for the user device 122 is different from the symmetric key $k_2$ for the user device 121. The key $k'_2$ is a symmetric key between the data device and the edge router. That is, because the same data m is being requested in this example, the same ciphertext $C_1$ is encrypted; however, for the user device 122, $C_1$ is encrypted using a different key $k'_2$. The edge router 141 runs the process $Enc_2(k'_2, C_1)$ (described above) and outputs the ciphertext $C'_2$. The edge router 141 also runs $Enc_0(k_p, k'_2)$ to encrypt the key $k'_2$ and output the ciphertext $C'_0$. Also, in an embodiment, the edge router 141 generates a signature for $C'_0$.

The edge router 141 sends the ciphertexts $C'_0$ and $C'_2$ to the user device 122 at step 230. Also, in an embodiment, the edge router 141 delivers that signature for $C'_0$ to the user device 122 together with the ciphertexts $C'_0$ and $C'_2$.

When the user device 122 accesses the retrieved ciphertext $C'_2$, the user device 122 presents its identity, the requested data name $Name_m$, $C'_0$, and the signature of $C'_0$ to the data device 110 at step 232.

The data device 110 uses that information to verify the identity of the user device 122 at step 234. The data device 110 also checks whether the user device 122 has the necessary permission to access the requested data or not. If not, the data device 110 aborts the access request. Otherwise, the data device 110 verifies the signature of $C'_0$, to make sure $C'_0$ was generated by the edge router 141, and then decrypts $C'_0$ to get $k'_2$ by running a process $Dec_0(k_s, C'_0)$ (described above). By retrieving $k_1$ according to $Name_m$, the data device then runs DecKeyGen($k_1, k'_2, k_s$) (described above) to generate the decryption key k'. The key k' is different from the key k that was sent to the user device 121.

The data device 110 sends the decryption key k' to the user device 122 at step 236. Moreover, the decryption key k' can be sent securely, e.g., by encrypting k' with the user device's public key, so that only the designated user device can recover it, or by sending the decryption key k' to a third security device, where the third security device keeps the security between the data device 110 and the user device 122.

When the user device 122 receives the decryption key k' from the data device 110, the user device runs the process $Dec_2(k', C'_2)$ to recover the bulky data m at step 238.

In the example of FIG. 2, the steps 206-218 can be performed in parallel with (at or about the same time as) the steps 226-238. That is, they are not necessarily performed sequentially as depicted in FIG. 2. The process of FIG. 2 can be called as Pull Model.

Figure 3:
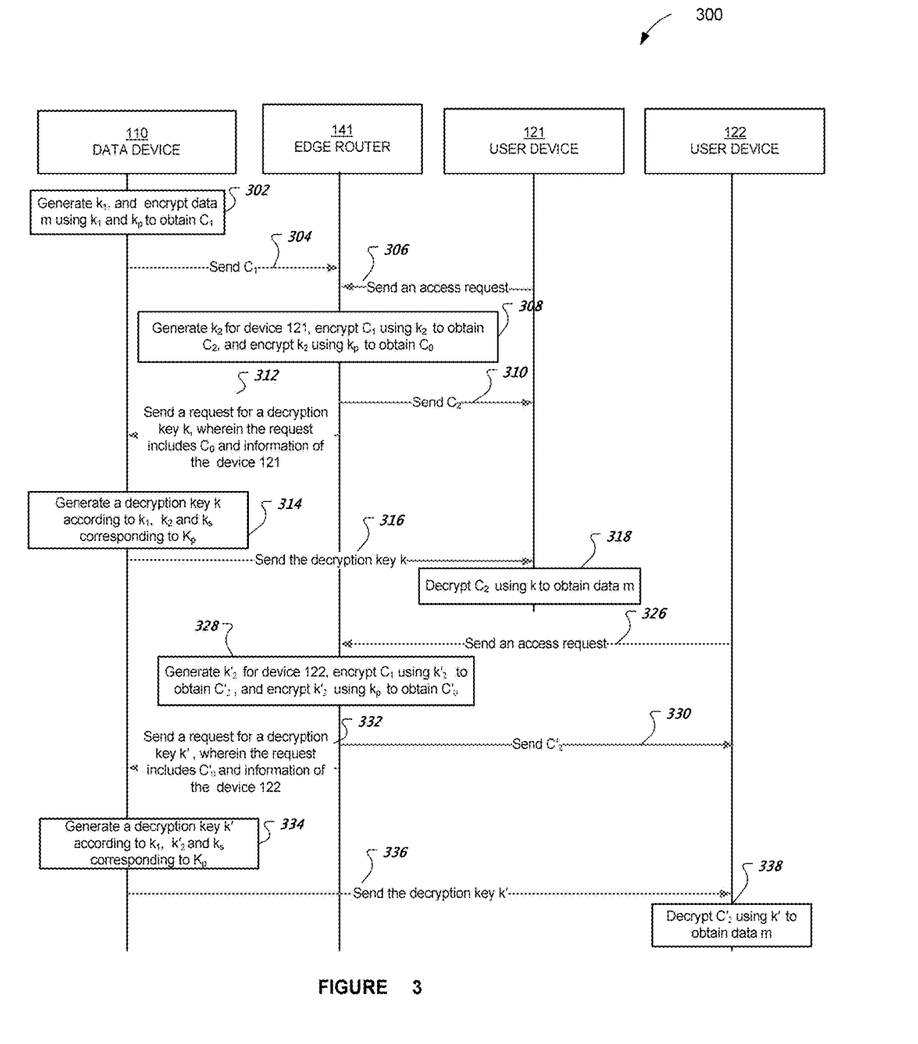
FIG. 3 illustrates a flowchart of a process in another embodiment according to the present disclosure.

FIG. 3 illustrates a flowchart 300 of a process in another embodiment according to the present disclosure. Similar, FIG. 3 is a diagram showing a sequence of actions and interactions among a data device 110, an edge router 141, and subscribers (user devices 121 and 122), in an embodiment according to the present disclosure.

Steps 302-308 in FIG. 3 are similar as steps 202-208 in FIG. 2. The edge router 141 sends the ciphertexts $C_2$ to the user device 121 at step 310. The edge router 141 sends a request for a decryption key to the data device 110 at step 312, wherein the request includes information of user device 121 (such as identity of the user device 121), the requested data name $Name_m$, the ciphertext $C_0$, and the signature of $C_0$. The signature of $C_0$ is used to authenticate that $C_0$ is really generated by the edge router 141. When the data device 110 deploys the service, it can pre-assign a pair of public/private keys for that service (the private key can be kept securely), so that the service can generate a signature on $C_0$. By doing this, the data device 110 can confirm that $C_0$ has really been generated by the edge router 141. In addition, the edge router 141 stores a relationship between $k_2$ and the information of the user device 121.

Steps 314-318 in FIG. 3 are similar as steps 214-218 in FIG. 2. Similarly, the data retrieval, access request, and data access operations can be repeated for a different user device (for example, the user device 122), as follows. Steps 326 and 328 in FIG. 3 are similar as steps 226 and 228 in FIG. 2. At step 330, the edge router 141 sends the ciphertexts $C'_2$ to the user device 122. At step 332, the edge router 141 sends a request for a decryption key to the data device 110, wherein the request includes information of user device 122 (such as identity of the user device 122), the requested data name $Name_m$, $C'_s$, and the signature of $C'_s$. The signature of $C'_0$ is used to authenticate that $C'_0$ is really generated by the edge router 141. In addition, the edge router 141 stores a relationship between $K'_2$ and the information of the user device 122. Steps 334-338 in FIG. 3 are similar as steps 234-238 in FIG. 2. The process of FIG. 3 can be called as Push Model.

In one scenario, a data device publishes video manifest profile. The video manifest profile is similar as data m in the above examples, and the video manifest profile includes section names. When a subscriber device wants to access video sections according to the sections names, the subscriber device sends a decryption key request to the data device. When receive a decryption key from the data device, the subscriber device decrypts ciphertext and get the video sections.

In the examples above, the two user devices are requesting access to the same data m (data having the same $Name_m$). That example can be readily extended to an example in which the devices are requesting different data. In essence, the steps 202 and 302 are performed for each instance of data (the ciphertext $C_1$ would be different for each instance of data, where each instance is identified by its own $Name_m$), and the other operations follow according to which instance of data is being accessed.

In general, the edge routers may not need to authenticate customers and may not need to maintain any state information. But, some existing security mechanism may be utilized to generate the second key. For example, in LTE/WiMAX 4G wireless technologies, a base station (an example of the edge router) would randomly generate a per-user-device symmetric key for the Message Authentication Code (MAC) to secure the air-interface communication between the base station and a cell phone (an example of the user device). This per-user-device key can be re-used as the second symmetric key. The base station chooses the second symmetric key independent of the data device. By separating security into two phases, one phase's security is not compromised if the other phase's security is compromised.

Thus, embodiments according to the present disclosure separate data distribution into two phases: a first phase between the data device 110 and the edge router 141; a second phase between the edge router 141 and user devices 121, between the edge router 141 and 122. In the first phase, data is encrypted using the same set of keys, so that the data can be shared. In the second phase, the encrypted data is re-encrypted under a key (e.g., k, k') specific to each user device. This approach may be referred to herein as dual-phase encryption.

Embodiments according to the present disclosure enjoy a number of advantages. The data publishing operation 202 only needs to be executed once for each instance of bulky data. The encrypted data can be shared by multiple users so that it can leverage in-network caching. Edge routers execute the data retrieval step 206 independently, requiring no communication with the data device 110 to do so. In addition, edge routers do not require key management, as $k_2$ is for one-time use and can be discarded immediately in FIG. 2. Embodiments according to the present disclosure are scalable because data delivery and access control can be separated. For example, the data device 110 can authenticate user devices and issue decryption keys, and the edge routers are responsible for data delivery. Accordingly, it is not necessary to maintain state information on the edge routers.

With dual-phase encryption, the decryption key cannot be used to derive the private key or the first key if the second key is chosen uniformly at random. Thus, if a customer's decryption key is compromised, it cannot be used to decrypt other data stored by the routers. Also, if a customer's authorization is revoked, data remains secure.

Figure 4:
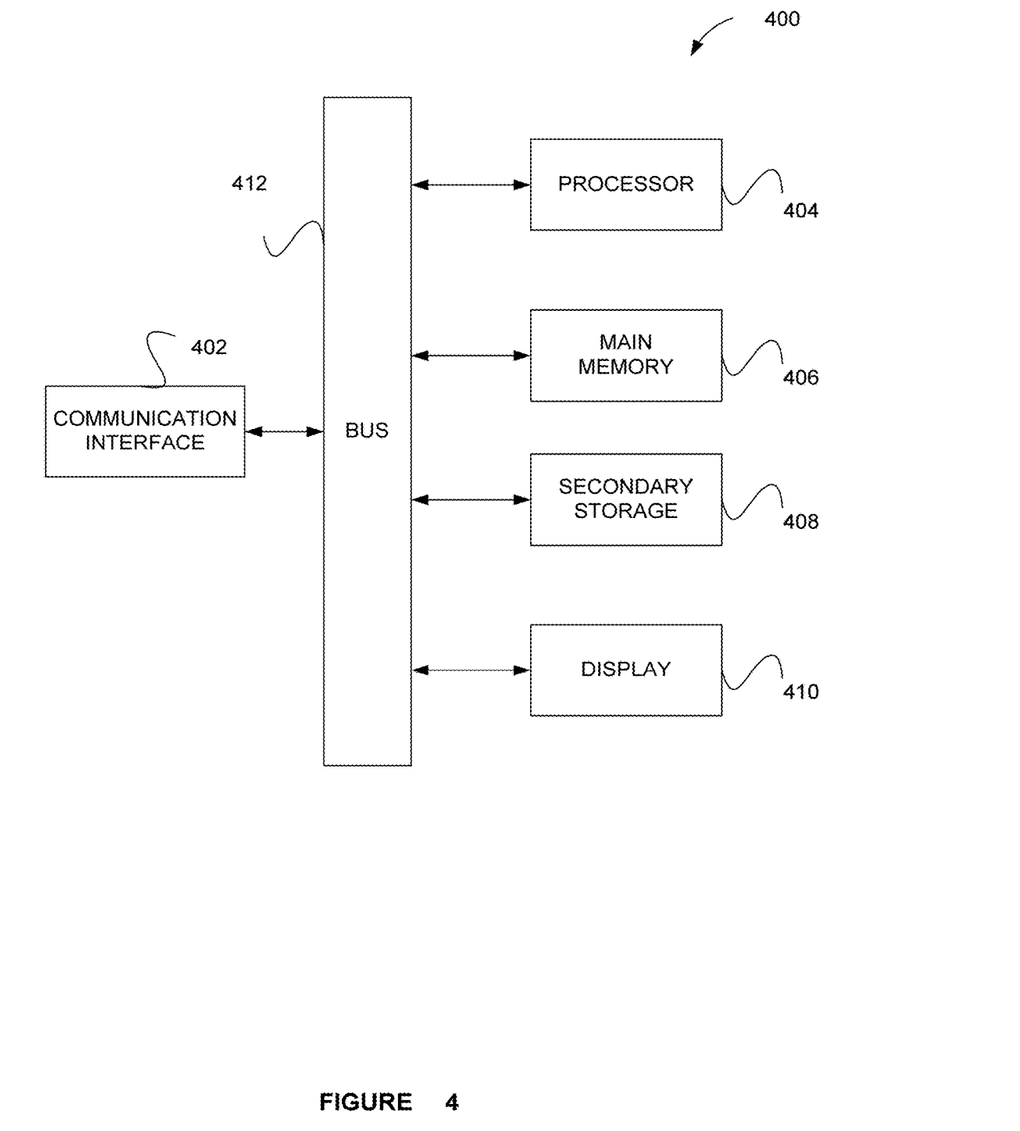
FIG. 4 is a block diagram of a computing device that may be used to implement embodiments according to the present invention.

FIG. 4 is a block diagram of an example of a computing device 400 capable of implementing embodiments according to the present invention. The device 400 broadly includes any single or multi-processor computing device or system capable of executing computer-readable instructions, such as those described in conjunction with FIGS. 2 and 3. That is, the device 400 can be implemented as the data device 110 or as the edge router 141 (FIG. 1), for example. In its most basic configuration, the device 400 may include at least one communication interface (e.g., the interface 402), at least one processing circuit (e.g., the processor 404) and at least one non-volatile storage medium (e.g., the memories 406 and 408), each of which may be interconnected via a communication bus 412.

The processor 404 of FIG. 4 generally represents any type or form of processing unit or circuit capable of processing data or interpreting and executing instructions. In certain embodiments, the processor 404 may receive instructions from a software application or module. These instructions may cause the processor 404 to perform the functions of one or more of the example embodiments described and/or illustrated herein.

The main memory 406 includes, for example, random access memory (RAM). The secondary storage 408 includes, for example, a hard disk drive and/or a removable storage drive, representing a floppy disk drive, a magnetic tape drive, a compact disk drive, etc. The removable storage drive reads from and/or writes to a removable storage unit in a well known manner. The memory or the storage includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Computer programs, or computer control logic algorithms, may be stored in the main memory 406, the secondary storage 408, and/or any other memory, for that matter. Such computer programs, when executed, enable the device 400 to perform various functions (as set forth above, for example).

The device 400 may also include one or more components or elements in addition to the processor 404 and the system memories 406, and 408. For example, the device 400 may include an input/output (I/O) device, and a display 410, each of which may be interconnected via the system bus 412.

The communication interface 402 broadly represents any type or form of communication device or adapter capable of facilitating communication between the device 400 and one or more other devices such as but not limited to routers and edge routers. The communication interface 402 can include, for example, a receiver and a transmitter that can be used to receive and transmit information (wired or wirelessly) such as, but not limited to, ciphertext and keys between devices in an ICN.

The device 400 can execute an application that allows it to perform operations (e.g., the operations of FIG. 2 or the operations of FIG. 3). A computer program containing the application may be loaded into the device 400. For example, all or a portion of the computer program stored on a computer-readable medium may be stored in the memory 406 or 408. When executed by the processor 404, the computer program can cause the processor to perform and/or be a means for performing the functions of the example embodiments described and/or illustrated herein. Additionally or alternatively, the example embodiments described and/or illustrated herein may be implemented in firmware and/or hardware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosed disclosure.

What is claimed is:

1. A router connected to a data device for distributing data to a user device, comprising:
   a processor; and
   a memory coupled to the processor and storing programming for execution by the processor;
   the processor being configured to execute the programming to perform operations of:
   receiving first ciphertext from the data device, the first ciphertext comprising data encrypted using a first key and a public key of the data device;
   generating a second key assigned to the user device;
   re-encrypting the first ciphertext using the second key to generate second ciphertext;
   encrypting the second key using the public key of the data device to generate third ciphertext;
   sending the second ciphertext to the user device;
   sending the third ciphertext to the user device or to the data device;
   generating an electronic signature that is associated with the third ciphertext;
   sending the electronic signature to the user device;
   receiving a decryption key request from the user device, wherein the decryption key request includes the electronic signature, the third ciphertext and information of the user device; and
   sending the electronic signature to the data device, wherein the electronic signature is used for the data device to authorize the router.

2. The router of claim 1, wherein the processor is further configured to execute the programming to perform operations of:
   sending the decryption key request to the data device.

3. The router of claim 1, wherein the memory is further configured to store a relation between the second key and the information of the user device, the processor is configured to send the third ciphertext and the information of the user device to the data device.

4. A data device for distributing data over network to a user device through a router connected to the user device, comprising:
   a processor; and
   a memory coupled to the processor and storing programming for execution by the processor;
   the processor being configured to execute the programming to perform operations of:
   generating a first key for data;
   encrypting the data using the first key and a public key of the data device to generate a first ciphertext;
   sending the first ciphertext to the router;
   receiving a third ciphertext, wherein the third ciphertext comprising a second key encrypted using the public key of the data device, and the second key is used for re-encrypting the first ciphertext to obtain a second ciphertext;
   generating a decryption key in response to receiving the third ciphertext, wherein the decryption key is generated based on the first key, the second key and a private key corresponding to the public key;
   sending the decryption key to the user device;
   receiving an electronic signature related to the third ciphertext; and
   determining that the third ciphertext is generated by the router by using the electronic signature.

5. The data device of claim 4, wherein the third ciphertext is received from the user device.

6. The data device of claim 4, wherein the third ciphertext is received from the router.

7. The data device of claim 4, wherein the memory is further configured to store a relation between the first key and information of the data, the processor is further configured to execute the programming to perform operations of:
   receiving the information of the data; and
   obtaining the first key according to the relation and the information of the data to generate the decryption key.

8. The data device of claim 4, before the processor generating the decryption key, wherein the processor is further configured to execute the programming to perform an operation of:
   determining whether the user device is authorized to access the data according to information of the user device.

9. A method for a router connected to a data device to distribute data to a user device, comprising:

receiving first ciphertext from the data device, the first ciphertext comprising data encrypted using a first key and a public key of the data device;

generating a second key assigned to the user device;

re-encrypting the first ciphertext using the second key to generate second ciphertext;

encrypting the second key using the public key of the data device to generate third ciphertext;

sending the second ciphertext to the user device;

sending the third ciphertext to the user device or to the data device;

generating an electronic signature that is associated with the third ciphertext;

sending the electronic signature to the user device;

receiving a decryption key request from the user device, wherein the decryption key request includes the electronic signature, the third ciphertext and information of the user device; and sending the electronic signature to the data device, wherein the electronic signature is used for the data device to authorize the router.

10. The method of claim 9, the method further comprises:

sending the decryption key request to the data device.

11. The method of claim 9, wherein a relation between the second key and the information of the user device is stored in the router, the method further comprises:

sending the third ciphertext and the information of the user device to the data device.

12. A method for a data device to distribute data to a user device through a router connected to the user device, comprising:

generating a first key for data;

encrypting the data using the first key and a public key of the data device to generate a first ciphertext;

sending the first ciphertext to the router;

receiving a third ciphertext, wherein the third ciphertext comprising a second key encrypted using the public key of the data device, and the second key is used for re-encrypting the first ciphertext to obtain a second ciphertext;

generating a decryption key in response to receiving the third ciphertext, wherein the decryption key is generated based on the first key, the second key and a private key corresponding to the public key;

sending the decryption key to the user device;

receiving an electronic signature related to the third ciphertext; and determining that the third ciphertext is generated by the router by using the electronic signature.

13. The method of claim 12, wherein the third ciphertext is received from the user device.

14. The method of claim 12, wherein the third ciphertext is received from the router.

15. The method of claim 12, wherein a relation between the first key and information of the data is stored in the data device, the method further comprises:

receiving the information of the data; and obtaining the first key according to the relation and the information of the data to generate the decryption key.

16. The method of claim 12, wherein the method further comprises:

determining whether the user device is authorized to access the data according to information of the user device.

* * * * *